United States Patent [19]

Adell

[11] Patent Number: 4,682,442
[45] Date of Patent: * Jul. 28, 1987

[54] DOOR EDGE GUARD AND METHOD

[75] Inventor: Robert Adell, Sunnyvale, Tex.

[73] Assignee: U.S. Product Development Company, Sunnyvale, Tex.

[*] Notice: The portion of the term of this patent subsequent to Apr. 15, 2003 has been disclaimed.

[21] Appl. No.: 836,041

[22] Filed: Mar. 4, 1986

[51] Int. Cl.$^4$ ............................................... B60J 5/00
[52] U.S. Cl. ........................................ 49/462; 52/716; 428/126
[58] Field of Search ........................... 49/462; 52/716; 428/126

[56] References Cited

U.S. PATENT DOCUMENTS 4,379,377  4/1983  Adell ..................................... 49/462
4,581,807  4/1986  Adell ................................. 49/462 X Primary Examiner—Kenneth Downey
Attorney, Agent, or Firm—Rhodes and Boller

[57] ABSTRACT

An edge guard for the trailing edge of a swinging closure comprises a metal strip formed into a general U-shape so as to have inner and outer legs of single thickness extending from a semi-circular base. Non-metallic insulating material is applied to the metal strip so as to be disposed in covering relation to at least certain portions of the strip including a covering relation which prevents the metal of the channel from contacting the trailing edge. Each leg comprises a ridge formed in one or both of the non-metallic material and the metal channel with the ridge projecting laterally of the leg. Various embodiments are disclosed.

20 Claims, 21 Drawing Figures

DOOR EDGE GUARD AND METHOD

BACKGROUND AND SUMMARY OF THE INVENTION

This invention relates to edge guards of the type which are applied to the trailing edges of swinging closures in automobiles, commonly referred to as door guards or door edge guards.

Many of applicant's patents relate to door edge guards of the self-retaining metallic type. Such edge guards are desirable because they provide superior characteristics for protection, appearance, and retention without the use of any separate fastening devices. Over more recent years applicant has developed insulated door edge guards of the self-retaining metallic type in which a non-metallic insulating material is cooperatively associated with the metal channel forming the door edge guard so that the metal of the door edge guard is insulated from the metal of the edge on which the edge guard is installed. This insulating feature enables such door guards (and the door's edges, too) to maintain their appearance and functional characteristics longer by minimizing the risk of development of problems which might otherwise occur when a dissimilar metal of the door edge guard is directly installed on the painted metal edge. The nature of these improvements is explained in detail in a number of applicant's patents and will not be repeated here in the interest of brevity.

While most of applicant's patents involve door edge guards in which a bead is formed at the distal end of one or both of the legs of the metal channel by reverse turning the distal end or ends back against the leg or legs, it is possible for a door edge guard to be constructed which does not have any beads so formed. While the formation of such beads results in a preferred product because of the increased strength and gripping power imparted to the legs, applicant has heretofore recognized that for certain uses a door edge guard whose legs consist solely of a single thickness of the metal channel can perform reasonably satisfactory, although such a product is deemed not as good as one having beaded distal ends formed by reverse turning.

Applicant's concept of utilizing single thickness metal legs for a self-retaining door edge guard channel goes back at least as early as his application Ser. No. 216,483 filed Dec. 15, 1980, abandoned in favor of pending continuation Ser. No. 575,430 filed Jan. 31, 1984.

Applicant's inventions also comprise the use of extrusion and co-extrusion processes to fabricate door edge guards, as disclosed in his pending allowed application Ser. No. 636,880, filed Aug. 2, 1984. According to the inventions of those processes a flat metal strip is processed through an extrusion or co-extrusion line which imparts plastic insulating material selectively to the metal strip. The metal strip is then coiled, while still in the flat, for subsequent processing by roll-forming apparatus which imparts the desired cross sectional shape to the strip thereby forming the door guard. One of the advantages of these processes is that different colored plastics may be extruded or co-extruded onto the metal strip and the metal wound into particular colored coils which can be stored and then subsequently uncoiled as required in order to provide desired colors for various specific door guards.

The present invention relates to an improvement in a door guard of the type which has single thickness metal legs, particularly relating to an improvement in an insulated metal edge guard. One aspect of the invention involves constructing the legs of the insulated metal edge guard in such a way that improved stiffening, gripping and retention characteristics are obtained in the context of a single thickness metal leg. Moreover, a related aspect is that the edge guard of this invention can be fabricated by the advantageous process described in application Ser. No. 636,880.

While the preferred embodiment of the invention will hereinafter be described in detail with reference to a number of specific examples, in general the invention relates to the formation of the legs in such a way that stiffening ridges are imparted to the legs either in the metal or in the insulation, but in a manner which does not require the reverse turning of the distal ends of the legs back against themselves. It is possible to perform these procedures in conjunction with the extrusion or co-extrusion process wherein insulation is applied to the metal strip while the metal strip is still basically in a condition which allows it to be wound into a coil for subsequent uncoiling, as needed, to form the insulated metal strip into the general U-shaped cross section of the edge guard.

Various embodiments of the invention are disclosed. The invention can be practiced with insulation on the interior of the metal channel and/or on the exterior of the channel, although it is preferred that there always be insulation on the interior so that the metal of the edge guard channel is insulated from the trailing edge onto which the edge guard is installed. Insulation on the exterior can provide desired coloration and/or color coordination schemes.

The foregoing features, advantages and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

DESCRIPTION OF THE PREFERRED EMBODIMENT

Figure 1:
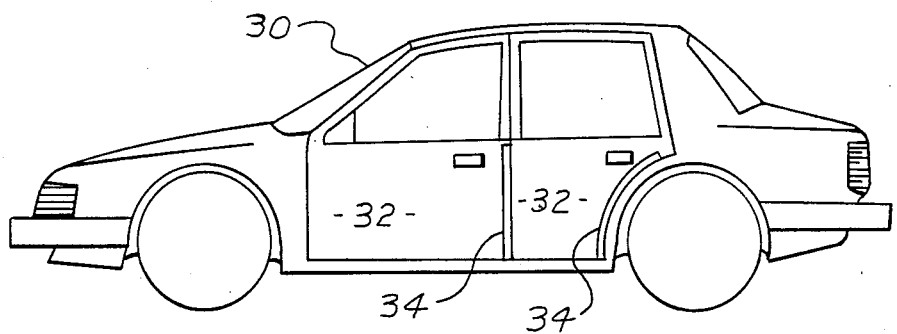
FIG. 1 is a side elevational view of an automobile vehicle containing door edge guards embodying principles of the invention.
Figure 2:
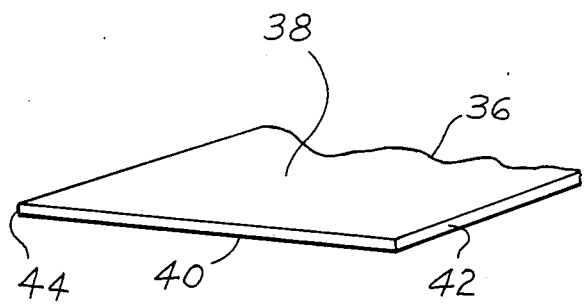
FIGS. 2, 3 and 4 are fragmentary end perspective views of various steps in the fabrication of a representative door edge guard of the present invention.
Figure 3:
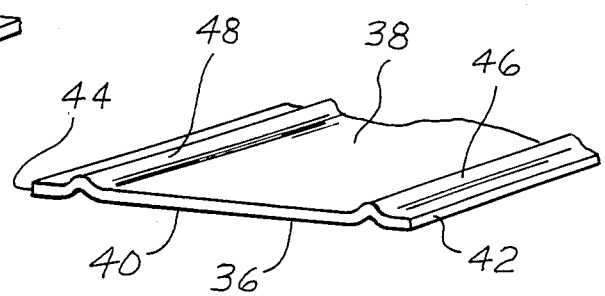
Figure 4:
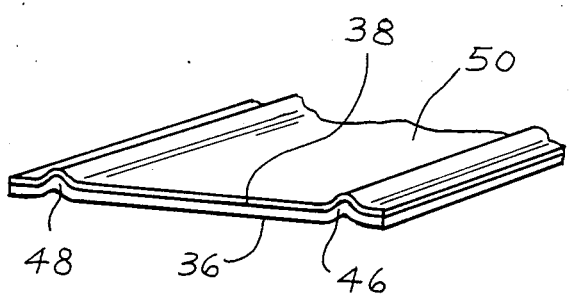

FIG. 1 illustrates an automotive vehicle 30 having doors 32 on whose trailing edges are disposed door edge guards 34 embodying principles of the present invention. Each door edge guard is conformed to the contour of the trailing edge on which it is installed and is of the self-retaining insulated metal type. FIGS. 2, 3 and 4 illustrate a sequence of steps in a process of fabrication of edge guards 34. These steps embody the method disclosed in the above referenced allowed application Ser. No. 636,880.

Figure 5:
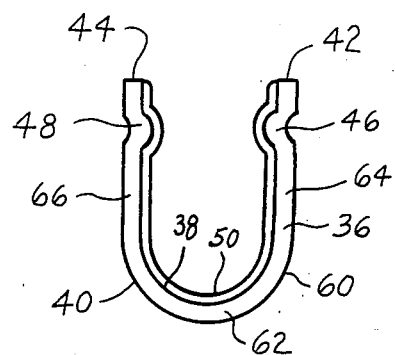
FIGS. 5-20 are transverse end views of representative door edge guards embodying principles of the present invention.

A flat metal strip 36 of appropriate thickness, width, and composition is conducted through a processing line and treated in an appropriate manner including the selective application of insulating material to it. A representative insulating material is plastic which is applied by conventional extrusion and/or co-extrusion apparatus. FIGS. 2, 3 and 4 illustrate a sequence of steps with reference to a particular selective application of plastic to the metal strip and a particular processing of the metal strip itself. It is to be appreciated that this is merely representative for purposes of illustration. As will be seen, this process which is illustrated with reference to FIGS. 2, 3 and 4 results in a product which is depicted in FIG. 5.

FIG. 2 illustrates flat metal strip 36 which may be considered to comprise major facial surfaces 38 and 40 and side edge surfaces 42 and 44. Hence in cross section the metal strip has a generally rectangular shape.

The metal strip is passed through any suitable type of device which is capable of imparting longitudinal ridges 46 and 48 to the metal strip as shown. These ridges are concave in surface 40 and convex in surface 38. They are shown to be spaced inwardly from the side edge surfaces 42 and 44 respectively of the strip. The rides may be created by means of rolling wheels for example.

In the illustrated embodiment of edge guard, nonmetallic insulating material 50 is then applied to the entirety of surface 38, including covering the convex surfaces of ridges 46 and 48. The insulating material is applied by extrusion or co-extrusion processes, while the particular insulating material may be of any suitable composition, polyvinylchloride (PVC) is presently a preferred material for its extrudability, cost, appearance, and other factors; it is to be appreciated however that other material or materials may be utilized.

The product shown in FIG. 4 is suitably processed after the extrusion or co-extrusion process to a stable condition where the insulated strip material can be wound into a coil (not shown). Such a coil forms the supply of insulated strip material which can subsequently be uncoiled and processed through suitable apparatus, such as a roll former, to form a finished edge guard product. Details of the apparatus and method of fabrication are disclosed in the above referenced application Ser. No. 636,880.

The edge guard product illustrated in FIG. 5 is identified by the reference numeral 60. It comprises a U-shaped cross section having a generally semi-circular base 62 from which extend inner and outer legs 64 and 66 respectively. The surface 38 becomes the interior of the U-shaped metal channel forming the edge guard and the surface 40 becomes the exterior of the U-shaped metal channel forming the edge guard. Since surface 40 will present substantially all of the exterior appearance of the edge guard it desirably possesses a suitable appearance characteristic. For example, stainless steel provides a characteristic of bright shiny metal, but other materials may be used as well.

The metal also has a resilient character whereby when the edge guard product is fitted onto the trailing edge of a swinging closure, such as the doors 32 in FIG. 2, the legs bear against opposite sides of the edge thereby providing the self-retention force. In this regard the edge guard product is so dimensioned in relation to the thickness of the edge onto which it is to be installed that the resilient self-retention action will take place. In other words the opening across the throat of the edge guard will be slightly less than the thickness of the edge onto which the edge guard is to be installed so that there is a slight flexing of the metal when the edge guard is installed on the door edge. In edge guard 60 this distance across the throat opening will be the distance between the portions of insulation 50 covering the convex surfaces of the ridges 46, 48. Where the door edge is of a substantially uniform thickness the distal ends 42, 44 will be spaced from the sides of the edge and therefore it is possible to omit insulation from the distal end edge surfaces 42 and 44. However in general it is preferable to have the insulation 50 extended so as to cover these distal end edge surfaces 42 and 44 as portrayed by the embodiment of edge guard 70 in FIG. 6. The embodiment 70 further differs from embodiment 60 in that the ridges 46 and 48 are formed in the opposite sense. In other words the ridges are concave toward the interior of the U-shaped cross section and convex on the exterior. The provision of the ridges however still performs a stiffening function and the self-retention force application by the legs will still be transmitted to the edge through insulating material 50 at the distal end portions of the legs immediately adjacent the distal end edges 42, 44.

Figure 6:
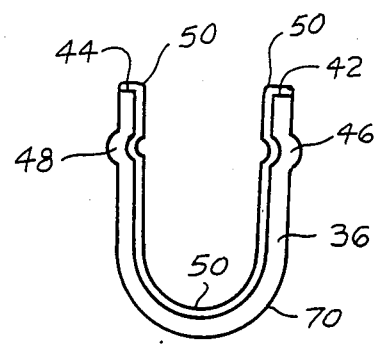
Figure 7:
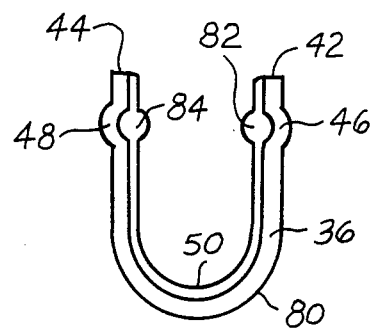

FIG. 7 illustrates another embodiment 80 which is similar to the embodiment of FIG. 6 in that the ridges 46, 48 are concave toward the interior of the edge guard and convex on the exterior. This embodiment differs however in that ridges 82 and 84 are provided in the material 50 which bear against the opposite sides of the door edge. Although embodiment 80 shows the distal end edge surfaces 42, 44 of the metal strip to be free of insulating material it may be desirable to extend the insulating material to cover them.

Figure 8:
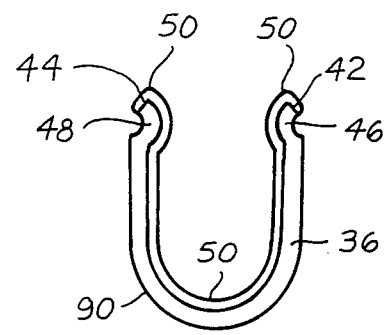

FIG. 8 illustrates a still further embodiment 90 in which the ridges 46 and 48 are formed immediately contiguous the distal end edge surfaces 42 and 44. Moreover these ridges have a slightly different shape which results in the distal end edge surfaces 42, 44 being canted slightly outwardly. The insulating material 50 is disposed in covering relation to the convex surfaces of the ridges which are toward the interior of the cross section as well as covering the distal end edge surfaces 42, 44.

Figure 9:
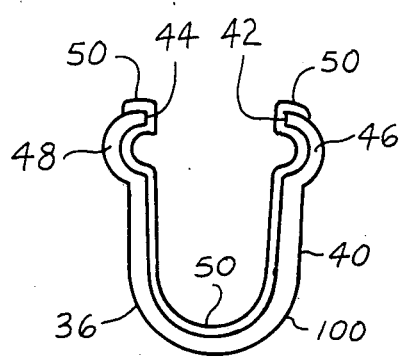

FIG. 9 illustrates an embodiment 100 in which the ridges 46, 48 are formed immediately contiguous the distal end edge surfaces 42 and 44 and so that the ridges are concave toward the interior of the cross section and convex on the exterior. The insulation 50 is a layer of uniform thickness and covers the distal end edge surfaces 42 and 44 and extends further around onto immediately adjacent margins of surface 40.

Figure 10:
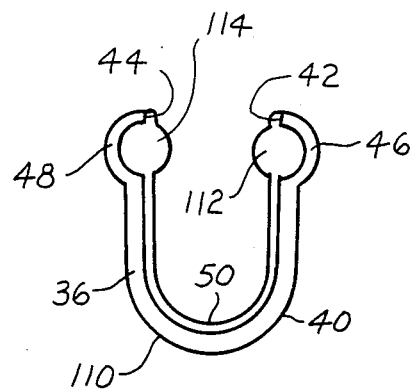

FIG. 10 portrays an embodiment 110 which is similar to embodiment 100 except that the thickness of the insulating material is enlarged at the concave surfaces of ridges 46 and 48 so as to form ridges 112, 114 which are convex toward the interior of the channel. The insulation extends to cover the distal end edge surfaces 42 and 44 but does not extend around onto the marginal side edges of surface 40.

Figure 11:
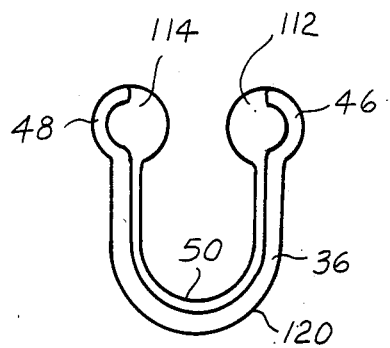

FIG. 11 illustrates an embodiment 120 which is similar to embodiment 110 except that the size of the ridges 112, 114 in the insulation 50 is enlarged from that shown in FIG. 10.

Figure 12:
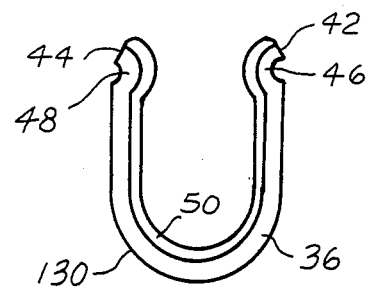

FIG. 12 shows an embodiment 130 which is similar to embodiment 90 of FIG. 8 except that the insulating material 50 is not extended onto the distal end edge surfaces 42, 44.

Figure 13:
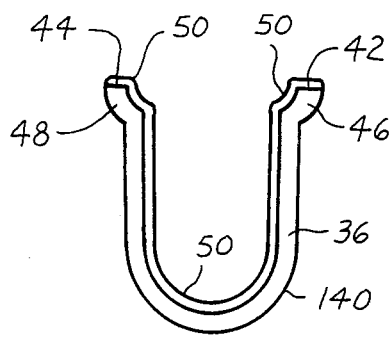

FIG. 13 illustrates an embodiment 140 in which the ridges 46, 48 have a somewhat different shape from any of the preceding embodiments. The ridges are formed immediately contiguous the distal end edge surfaces 42 and 44 and are portrayed as having a somewhat quarter-circular shape as distinguished for example from the somewhat semi-circular shape represented by embodiment 100. In embodiment 140 the insulating material 50 is a layer of uniform thickness covering the entire interior of the cross section as well as the distal end edge surfaces 42, 44.

Figure 14:
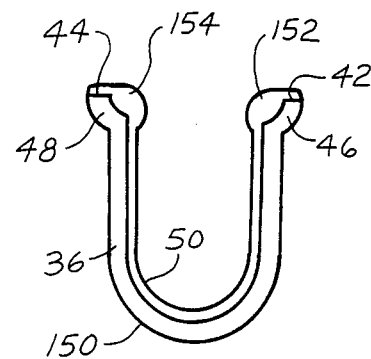

FIG. 14 shows an embodiment 150 which is like embodiment 140 except that the insulating material 50 is provided with ridges 152, 154 at the ridges 46, 48.

Figure 15:
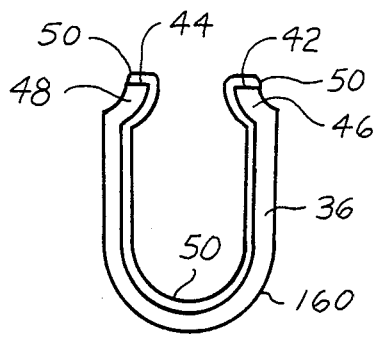

FIG. 15 illustrates an embodiment 160 which is like embodiment 140 of FIG. 13 except that the ridges 46, 48 are turned inwardly instead of outwardly. In this embodiment the insulating layer 50 is of uniform thickness covering the entire interior of the cross section as well as the distal end edge surfaces 42, 44.

Figure 16:
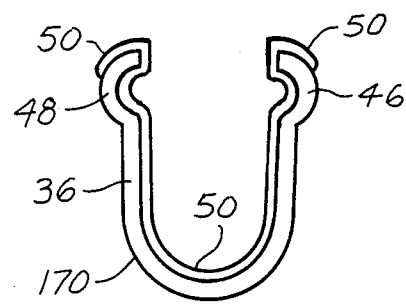

FIG. 16 illustrates an embodiment 170 which is like the embodiment 100 of FIG. 9 except that the insulating material 50 is extended further around onto the exterior surface of the respective ridges 46, 48 than in embodiment 100.

Figure 17:
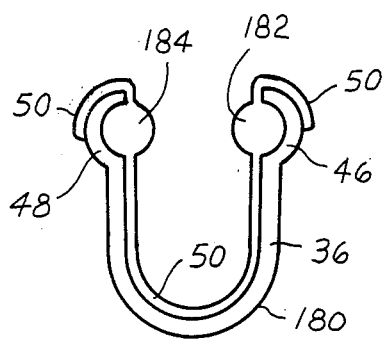

FIG. 17 shows an embodiment 180 which is like embodiment 170 of FIG. 16 except that the insulating material 50 is formed with ridges 182, 184 respectively at the ridges 46 and 48.

Figure 18:
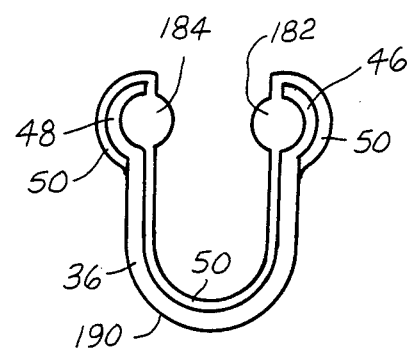

FIG. 18 shows an embodiment 190 which is like embodiment 180 except that the insulating material 50 is extended around to cover the full exterior of each ridge 46, 48.

In any of the embodiments disclosed, it is possible for desired color coordination effects to be achieved by the selective coloration of insulating material and its disposition on the exterior of the channel. It is possible to provide a full external covering of the metal by non-metallic material of the desired color and in this way give the edge guard product a desired outward color appearance. When the exterior is so colored, the metal of the edge guard channel will not be exposed to view and therefore a lower grade of material may be used than would be the case for other types of edge guards where exterior of the metal or at least a portion thereof is to present all or some of the exterior appearance.

Figure 19:
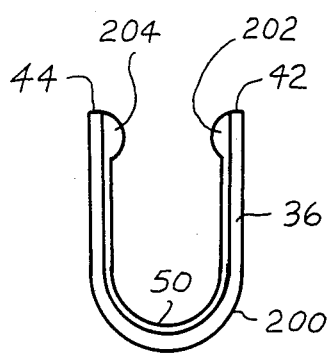

FIG. 19 shows an embodiment of edge guard 200 in which there are no ridges in the legs or the metal channel but rather the ridges are provided exclusively in the formation of the non-metallic insulating material 50. In the embodiment 200 of FIG. 19 these ridges are designated by the reference numerals 202 and 204. Although not shown in this Fig. it is possible for the insulation to be extended around onto the distal end edge surfaces 42, 44 and even further, as desired, onto the exterior surfaces. Embodiment 200 shows these ridges 202, 204 to be disposed immediately contiguous the distal end edge surfaces 42, 44.

Figure 20:
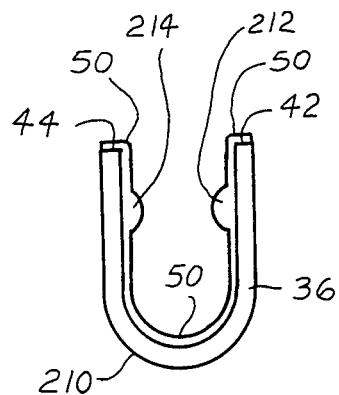

FIG. 20 discloses another embodiment 210 which contains ridges 212, 214 corresponding to ridges 202, 204 and in spaced relation to the distal end edge surfaces 42, 44. In embodiment 210 the insulating material 50 covers the full interior of the cross section and also extends around onto the distal end edges 42, 44.

The various embodiments of edge guard may be fabricated according to the procedures described in connection with FIGS. 2, 3 and 4 so as to create the insulated metal strip. In extrusion and co-extrusion processes there is a certain degree of control which can be exercised in controlling the thickness and shape of the resulting cross section. It is to be appreciated that the drawing Figs. are intended to be illustrative of principles of the invention and they should not be construed as to necessarily being to any particular scale, or proportions. In general, the thickness of the insulating layer 50 will be considerably thinner than the thickness of the metal strip. Likewise the particular sizes and shapes of the ridges which are formed in the metal are intended to be illustrative of general principles and not necessarily to any particular scale. In the actual fabrication process there may be some rounding and/or feathering of the insulating material at corners and edges.

In certain of the embodiments insulation has not been provided on the distal end edge surfaces 42 and 44. In such instances it may be desirable to perform operations so that sharp corners are removed. However where insulation is applied in a covering relation to the distal end edge surfaces, such additional procedures may not necessarily be required. In other words in certain instances it may be possible to omit any separate treatment procedures on the distal end edges of the metal strip because they will eventually be covered by a sufficient thickness of insulating material.

Figure 21:
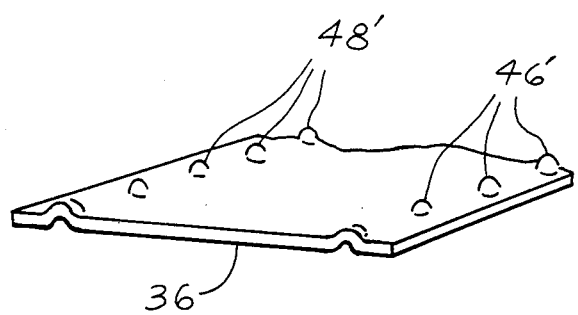
FIG. 21 is a view illustrating an alternate processing step in the fabrication of a door edge guard which is alternate to the step depicted in FIG. 3.

FIG. 21 illustrates a step which can be alternate to the step depicted in FIG. 3. Instead of forming the ridges 46, 48 as continuous lengths along the length of the metal strip, a series of spaced apart indentations 46', 48' forming discontinuous ridges may be used. These will impart a certain stiffening to the metal and may perform satisfactorily for certain applications.

While a preferred embodiment of the invention has been disclosed, it will be appreciated that principles are applicable to other embodiments.

What is claimed is:

1. In combination with the trailing edge of a swinging closure, a self-retaining insulating metal edge guard fitted onto said trailing edge comprising an elongate metal channel having in transverse view inner and outer legs extending from a generally semi-circular base, said inner and outer legs serving to apply self-retention forces to opposite sides of said trailing edge, said channel being formed from a metal strip of uniform thickness, non-metallic insulating material disposed on said metal channel in covering relation to said legs and base including a covering relation wherein direct contact of the metal of the channel with said trailing edge is prevented by said non-metallic insulating material, and ridges formed in said legs in at least one of said channel and said non-metallic insulating material to project laterally of said legs and thereby form laterally projecting protuberances, said ridges being disposed such that said legs apply self-retention forces to opposite sides of said trailing edge via said ridges, and in which said legs include straight segments immediately contiguous said ridges and located proximally in said legs relative to said ridges.

2. The combination set forth in claim 1 in which said ridges are formed in the metal channel and said non-metallic insulating material is applied to the metal channel in covering relationship to said ridges.

3. The combination set forth in claim 2 in which ridges are imparted to the metal channel before the non-metallic insulating material is applied to the channel.

4. The combination set forth in claim 1 in which said ridges are formed in said insulating material.

5. The combination set forth in claim 1 in which said ridges are spaced proximally of the distal ends of the legs.

6. The combination set forth in claim 1 in which said ridges are disposed immediately contiguous the distal ends of the legs.

7. The combination set forth in claim 1 in which said ridges project laterally inwardly of the legs toward the interior of the channel.

8. The combination set forth in claim 7 in which said non-metallic insulating material comprises a layer on the interior of the channel of substantially uniform thickness throughout including covering of said ridges.

9. The combination set forth in claim 1 in which said ridges are formed in said metal channel to project laterally outwardly.

10. The combination set forth in claim 9 in which said non-metallic insulating material is of substantially uniform thickness to line the entire interior of the channel including concave interior surface portions of said ridges.

11. In combination with the trailing edge of a swinging closure, a self-retaining insulating metal edge guard fitted onto said trailing edge comprising an elongate metal channel having in transverse view inner and outer legs extending from a generally semi-circular base, said inner and outer legs serving to apply self-retention forces to opposite sides of said trailing edge, said channel being formed from a metal strip of uniform thickness, non-metallic insulating material disposed on said metal channel in covering relation to said legs and base including a covering relation wherein direct contact of the metal of the channel with said trailing edge is prevented by said non-metallic insulating material, and ridges formed in said legs in at least one of said channel and said non-metallic insulating material to project laterally of said legs, in which said ridges are formed in said metal channel to project laterally outwardly, and in which said non-metallic insulating material comprises a nominal thickness lining the interior of the channel and integral enlarged ridges of insulating material disposed at the ridges in the metal channel, but each projecting in the laterally opposite sense from the corresponding ridge in the metal channel.

12. The combination set forth in claim 1 in which said ridges have generally semi-circular shapes.

13. The combination set forth in claim 1 in which said ridges have generally quarter-circular shapes.

14. In combination with the trailing edge of a swinging closure, a self-retaining insulating metal edge guard fitted onto said trailing edge comprising an elongate metal channel having in transverse view inner and outer legs extending from a generally semi-circular base, said inner and outer legs serving to apply self-retention forces to opposite sides of said trailing edge, said channel being formed from a metal strip of uniform thickness, non-metallic insulating material disposed on said metal channel in covering relation to said legs and base including a covering relation wherein direct contact of the metal of the channel with said trailing edge is prevented by said non-metallic insulating material, and a ridge formed in at least one of the legs of the metal channel to project laterally of said one leg and thereby form a laterally convex proturberance, such protuberance being disposed such that the self-retention applied by its own leg to said trailing edge is via the protuberance.

15. The combination set forth in claim 14 in which such ridge is spaced proximally of the distal end of its leg.

16. The combination set forth in claim 14 in which such ridge is disposed immediately contiguous the distal end of its leg.

17. The combination set forth in claim 14 in which such ridge projects laterally inwardly of its leg, toward the interior of the channel.

18. The combination set forth in claim 14 in which such ridge is formed in said metal channel to project laterally outwardly.

19. The combination set forth in claim 14 in which such ridge has a generally semi-circular shape.

20. The combination set forth in claim 14 in which such ridge has a generally quarter-circular shape.

* * * * *